R. Jane.
Paddle Wheel.
No. 995. Reissued July 3, 1860.
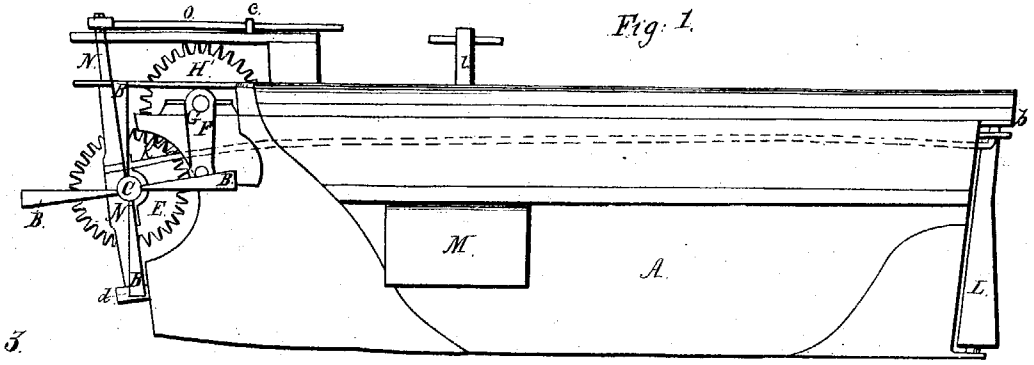
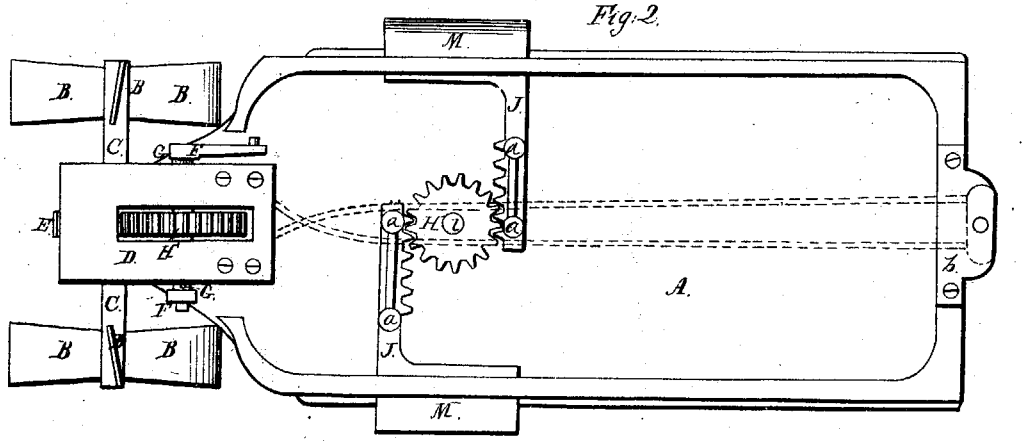
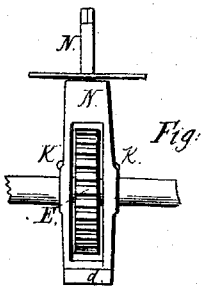
N. PETERS, PHOTO-LITHOGRAPHER, WASHINGTON, D. C.

UNITED STATES PATENT OFFICE.

REUBEN JANE, OF OTEGO, NEW YORK.

IMPROVEMENT IN ATTACHING PADDLE-WHEELS TO CANAL-BOATS.

Specification forming part of Letters Patent No. 18,694, dated November 24, 1857; Reissue No. 995, dated July 3, 1860.

*To all whom it may concern:*

Be it known that I, REUBEN JANE, of the town of Otego, county of Otsego, in the State of New York, have invented a new and improved paddle wheel, and the mode of attaching the same to canal-boats, which, in connection with wings on the sides of the boat, will effectually prevent the current of water from washing the banks of the canal or other water—a difficulty which has heretofore prevented the use of steam to propel boats on the canals; and I do hereby declare that the following is a full and exact description thereof, reference being had to the accompanying drawings, and to the letters of reference marked thereon.

The nature of my invention consists in hanging the wheel in the fore part of the boat, with the paddle so turned that it will throw the current of water from the bow of the boat into or against the wings, which turn the water in toward the sides of the boat at or near the back end or stern of the boat, and thus to apply the steam-engine to propel boats on the canals, and entirely obviates the damage to the banks of the canal heretofore preventing the use of steam as a motive power to run boats on canals or other waters.

To enable others skilled in the art to make and use my invention, I will describe its construction and operation.

In the construction of my invention, in Figure 1, A is the boat; B, the wheel; C, the shaft on which the paddle-wheels are attached at each end of the same; E, the gear-wheel on the center of the shaft, and which meshes into the gear-wheel H′, which is driven by the engine; F, the crank on the end of shaft G, to which I attach the piston-rods of the engine; M, adjustable wings; N, the slotted pivot vertical shaft, on which the shaft C is hung, with bearings on each side of the slot; O, the lever for operating said vertical shaft; *c*, a guide to retain lever O in position; K, the rods attached on each side of the slot in shaft N, and extending back to the rudder and operating the same; L, the rudder; *b*, the bearing for the upper end of the rudder; *d*, the lower bearing for the lower end of the same; D, upper bearing; *d*, lower bearing of shaft N.

In Fig. 2, A is the boat; B, the paddle-wheels; C, the shaft to which the paddle-wheels are attached; D, the plate acting as a bearing for the upper end of the vertical slotted shaft N; H′, the main gear-wheel; F, the cranks attached to the shaft G; H, the pinion-wheel, with shaft extending to the deck of the boat; I, the racks into which the pinion-wheel operates to adjust the side wings or flaps; M, the wings; *a*, the bearings on which the racks I slide by means of the slots in them; *b*, the bearings for the upper end of the rudder. The rods connecting the shaft N with the rudder are shown in dotted lines.

In Fig. 3, N is the vertical slotted shaft; C, the shaft; N *d*, the lower bearing.

In the operation of my invention I place the whole arrangement for operating the boat in front of the same. The vertical shaft is set, as described, on bearings *d* below and bearing D above, and on these bearings it is allowed to turn, and is operated by means of the lever *o* on the deck and bow of the boat. The shaft C is arranged with bearings on the rear side of the slotted lever N, having gear-wheel E on its center, hung within the slot in shaft N, and has the paddle-wheels B firmly secured at the ends of said shafts. The shaft C and gear-wheel E can be raised or lowered to suit the weight of the vessel. The rods *k* are attached to the sides of the shaft N, and extend back to the rudder to operate it. The shaft G has the gear-wheel H′, also secured on its center, and meshes into the gear-wheel E to the ends of the shaft *g* or cranks F, to which is attached the piston-rods of the engine, and by which means the power is applied to the paddle wheels when the motion is applied. The paddle-wheels are put in motion by means of the gear-wheels H′ and E, the paddles operating on still water, which they continue to do, and by means of the peculiar twist given the arms of the wheels the water is thrown away from the bow of the boat, and as the boat is drawn over the agitated water it will before it leaves the stern of the boat be smoothed down and become entirely smooth. So in regard to the agitation given to the water sidewise, just as soon as it has passed from the bow of the boat, and before it falls on the sides of the same, the wings M catch the water and cause it to pass between the wings M and the sides of the sides of the boat, thus perfectly checking the agitation of the water and preventing it extending to the banks of the canal. These two advantages are gained by means of my invention, which two objections have been found to exist hitherto in all attempts to use steam as a motive power on canals.

It has always been found that the agitation of the water by the wheels has so agitated it that it lashed the sides of the canal so as to injure it, and so disturbed the bottom as to injure it also. These objections experience has fully demonstrated I have overcome by means of my invention. It will be further seen that by means of the shaft C being hung on the vertical shaft N, I am able to guide the boat by means of the lever O, either with or without the rudder L and its attachments, as set forth.

The slightest change of the shaft C will guide the boat to either the starboard or larb ard side without the least diminishing its speed or decreasing its propelling-power, so that the steering of the boat is done always by its propelling-power. By means of the vertical shaft C, on which the pinion H is attached, I operate the wings M, so that when I am about to enter a lock I slide them close into the sides of the boat, so that I enter the lock having no obstruction; and as soon as I leave the lock I slide the wings out, so that the agitation of the water is smoothed down before it reaches the sides of the canal, thus completely allaying all agitation of the water after it has passed between the wings M and the sides of the boat. As the vertical lever N is moved by means of the lever O, the rods K operate rudder L, which always operates in conformity with the change in the paddle-wheels. The gear-wheels E and H′ are so geared into each that, whether the boat is running in a straight line or to either side, they always mesh into each other without inconvenience.

Having thus described the construction and operation of my invention, what I claim as new, and desire to secure by Letters Patent, is—

1. The bow-wheels B, the connecting-rods *k*, the rudder L, the operating-lever O, constructed and arranged substantially as and for the purposes described.

2. The wheels B, constructed with twisted floats, in combination with the preceding.

3. The arrangement of the vertical slotted shaft N, supporting the wheels B and gear-wheel E, in combination with the preceding, the whole operating as described and set forth.

REUBEN JANE.

Witnesses:
CHAS. B. BURCH,
T. G. CLAYTON.